United States Patent [19]

West

[11] Patent Number: 4,791,014
[45] Date of Patent: Dec. 13, 1988

[54] CLIP ATTACHMENT TAPE

[76] Inventor: Robert J. West, RFD 1, Box 682, Pownal, Me. 04069

[21] Appl. No.: 98,962

[22] Filed: Sep. 21, 1987

[51] Int. Cl.$^4$ .............................................. B32B 3/10
[52] U.S. Cl. .................................... 428/43; 428/137; 428/136; 428/138; 206/340; 206/820
[58] Field of Search ............... 428/43, 136, 137, 138; 206/820, 338, 340, 341, 345, 346, 347

[56] References Cited

U.S. PATENT DOCUMENTS 3,115,417 12/1963 Christensen ........................ 428/43
4,512,472 4/1985 Jarund ............................ 206/820 X Primary Examiner—Alexander S. Thomas
Attorney, Agent, or Firm—William Nitkin

[57] ABSTRACT

An improved tape to hold series of clips together, such tape having a series of perforations between adjacent clips wherein perforations defined on the side of the allow sections of the tape to adhere to the contours of the body of the clip and a central perforation defined in the tape within the outer side perforations forms a pair of narrow bridges of tape between each clip holding the clips together ready for the cutting or separation of such tape when such clip is installed.

1 Claim, 1 Drawing Sheet

CLIP ATTACHMENT TAPE

BACKGROUND OF THE INVENTION

1. Field of the Invention

The structure of this invention is a tape to hold series of clips together and more particularly relates an improved tape structure for holding a plurality of hog-ring type clips in a row for application of each clip in turn by a tool.

2. Description of the Prior Art

Hog-ring clips have long been held in rows and applied one at a time therefrom, either by manually or power-operated tools. It has been found desirable to run a strip of tape along the tops of a plurality of these clips to hold them in a series to retain the clips aligned in position for installation. The applying tools usually include means to cut or break the tape to allow each clip to be separated from the rest of the series and individually applied. In at least one embodiment, a type of carrier strip has been applied over the top crown of each clip which strip extends into each valley between adjacent clips to assist in preventing misalignment of any of the clips during the installation process.

Problems in the prior art have occurred. For example, when the tape is too strong, individual clips will not separate easily from the rest. Further, residual tape between clips can build up on the cutter, frequently clogging the tool. The sticky tape residue has to be frequently cleaned off otherwise the residue would cause the machine to malfunction and slow down production time. For some carrier strips that are applied over the tops of clips, extensive and expensive machinery must be utilized to cause the carrier strip's adhesive to be applied within the valleys between the crowns of the tape so as to hold the clips in alignment.

SUMMARY OF THE INVENTION

It is an object of this invention to provide a tape structure to hold series of hog-ring type clips together in a row for installation which improved tape has a series of perforations therein. A portion of the tape is adapted to adhere securely to each clip, and connecting bridge segments hold adjacent clips together which can be then easily separated during the installation process. The tape of this invention avoids the occurrence of residue build-up on cutting members. To this end a tape is provided with a plurality of perforations extending transversely between each adjoining clip in the series with the side portions of the tape which are adjacent to the slits located on each side of the tape being adhered to the curvature of each clip with a slit in the center of the tape forming a pair of narrow bands of tape acting as a bridge of tape between each adjacent clip. These tape bridges are easily severed or pulled apart and the remaining tape remains on the installed clip and does not clog the cutter or cutting mechanism of the applying tool.

DESCRIPTION OF THE PREFERRED EMBODIMENT(S)

Figure 1:
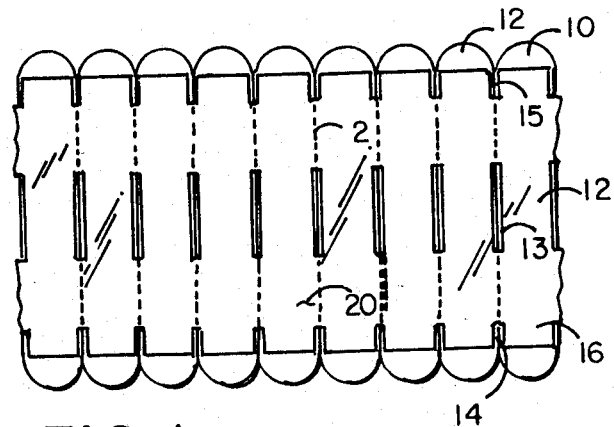
FIG. 1 is a top view of a portion of the perforated tape of this invention applied to a plurality of clips.
Figure 2:
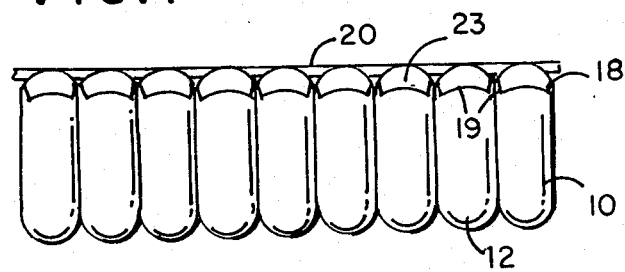
FIG. 2 is a side view of the clips.
Figure 3:
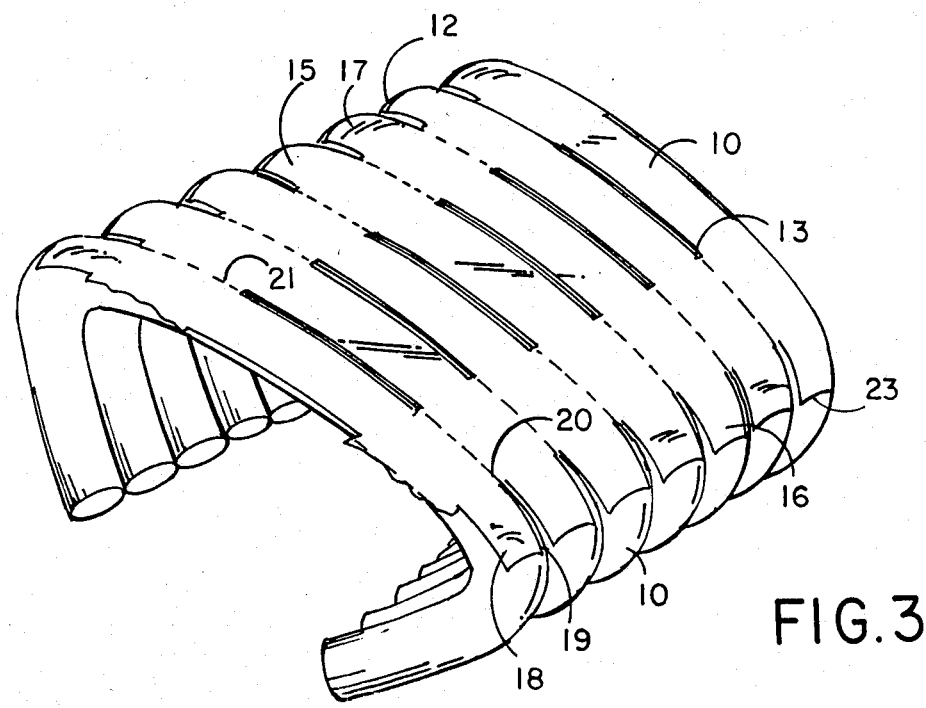
FIG. 3 is a prespective view of a series of clips held by the tape of this invention.

FIG. 1 illustrates a top view of a portion of the perforated tape of this invention applied to a plurality of ring clips, the bottoms of which are not shown in FIG. 1 but which are well known in the art and can be seen in FIG. 3. These clips 10 can be of the hog-ring type and can be of any size. It should be noted that the tape of this invention can also be applied to U-clips or other clips which are applied serially in applying tools whereby they must be positioned one after another on feed means or in an entry device to the application tool. The structure of this invention is the perforated tape itself which holds the clips together and the combination thereof. The tape can be clear plastic, cellophane tape or equivalent. A series of perforations such as perforations or slits 13, 14 and 15 between clips 10 and 11 are seen in FIG. 1. These perforations are cut into the tape which tape runs from crown 23 to crown as seen in FIG. 2. Where tape 12 has been cut as slits 14 and 15, the tape at the edges of such slits adheres around the body of clip 10 such as seen in FIG. 2 where such tape segment with sides 18 and 19 of the tape which have been separated from the adjacent segments by such slits then fall and form down around clip 10 and adhere thereto, leaving bridges 20 and 21 as seen in FIGS. 1 and 3 to interconnect the clips with slit 13 formed therebetween. FIG. 3 shows these features in a perspective view. In this way the major portion of the tape between adjacent clips 10 and 12 has been cut but yet the clips are attached to the body of the tape where it is applied at segments 16 and 17 much more securely than if the tape were merely only running across the tops of crowns 23 of the clips where only a minor portion of the adhesive of the tape would contact the clip thereby allowing the clips to become easily dislodged or moved. Once side slots 14 and 15 are created, the edges of the tape can adhere at segments 16 and 17 far more securely to the clip while at the same time allowing the two bridge elements 20 and 21 to retain one clip to the next which elements with central slit 13 defined therebetween, form two narrow yet strong bridges which can be easily cut by a knife element or can even be easily separated by a tool which will tear them apart. This tearing apart can be thus done much more easily and successfully than if the entire band of tape were present as in the prior art. With its perforations and improved adherence to the crown of each individual clip, the perforated tape of this invention represents a significant advance over the prior art. The slits can be made in the tape as it is applied to the clips. It should be noted that in some application tools, knife members will cut away the tape bridges while in other tools a combination of cutting and physical tearing of the tape will separate it for installation of each clip.

Although the present invention has been described with reference to particular embodiments, it will be apparent to those skilled in the art that variations and modifications can be substituted therefor without departing from the principles and spirit of the invention.

I claim:

1. In combination, a row of clips arrayed adjacent to one another in a series for application by a tool, each clip having a crown and body portion and an adhering tape extending lengthwise to said row of clips, said tape applied on the crown portions of said clips, said tape having a plurality of rows of perforations defined therein extending perpendicularly to the length of said tape, each row of perforations positioned in the area between adjacent clips; each row of perforations including first and second side slits defined at each side of said tape forming loose ends of said tape between adjacent rows of said slits which tape's loose ends adhere to the body of said clip thereunder; and a central slit defined in said tape in line with said first and second side slits, leaving narrow bridges of unperforated tape therebetween holding each clip to the adjacent clip.

* * * * *